Patented Jan. 3, 1950

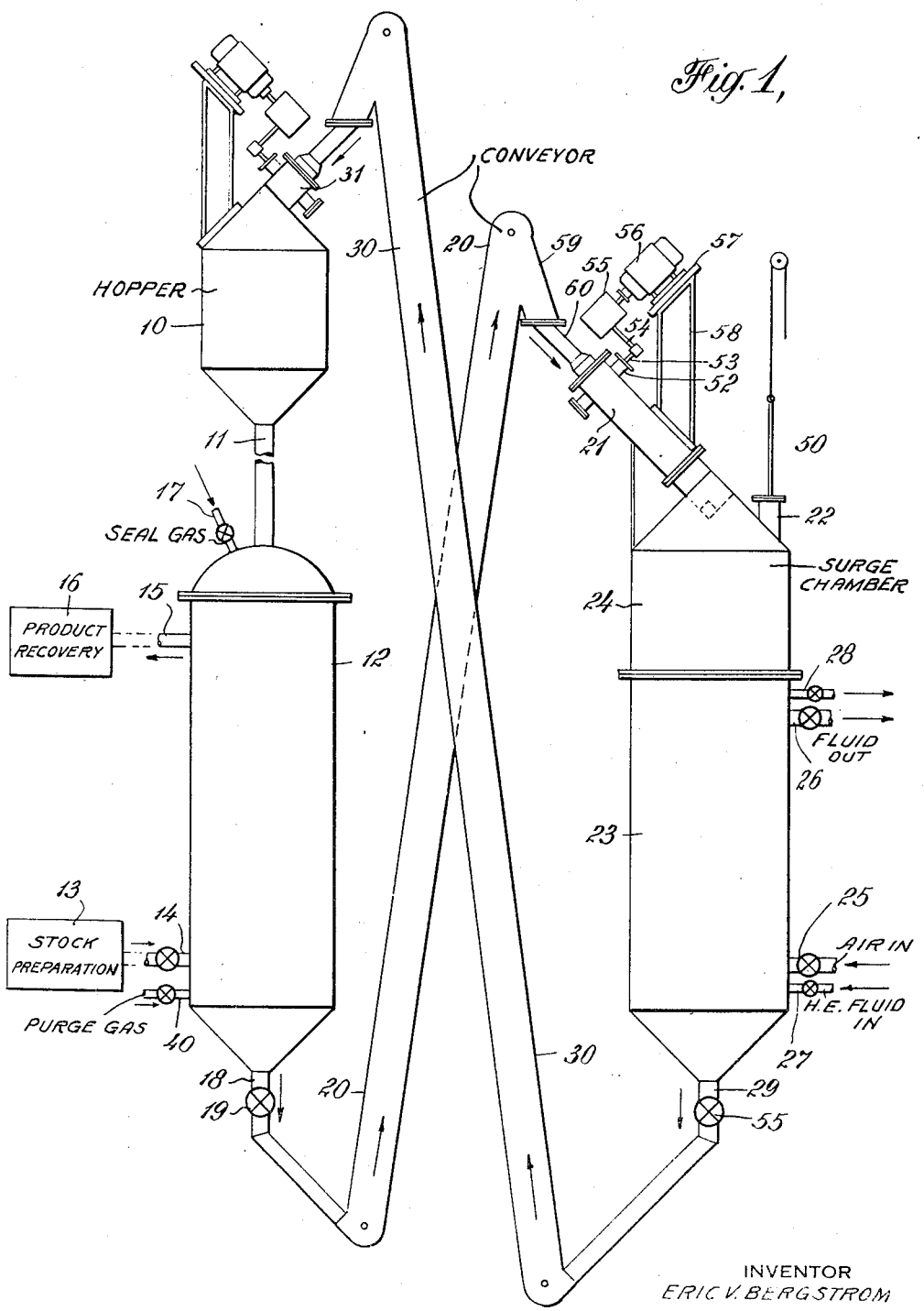

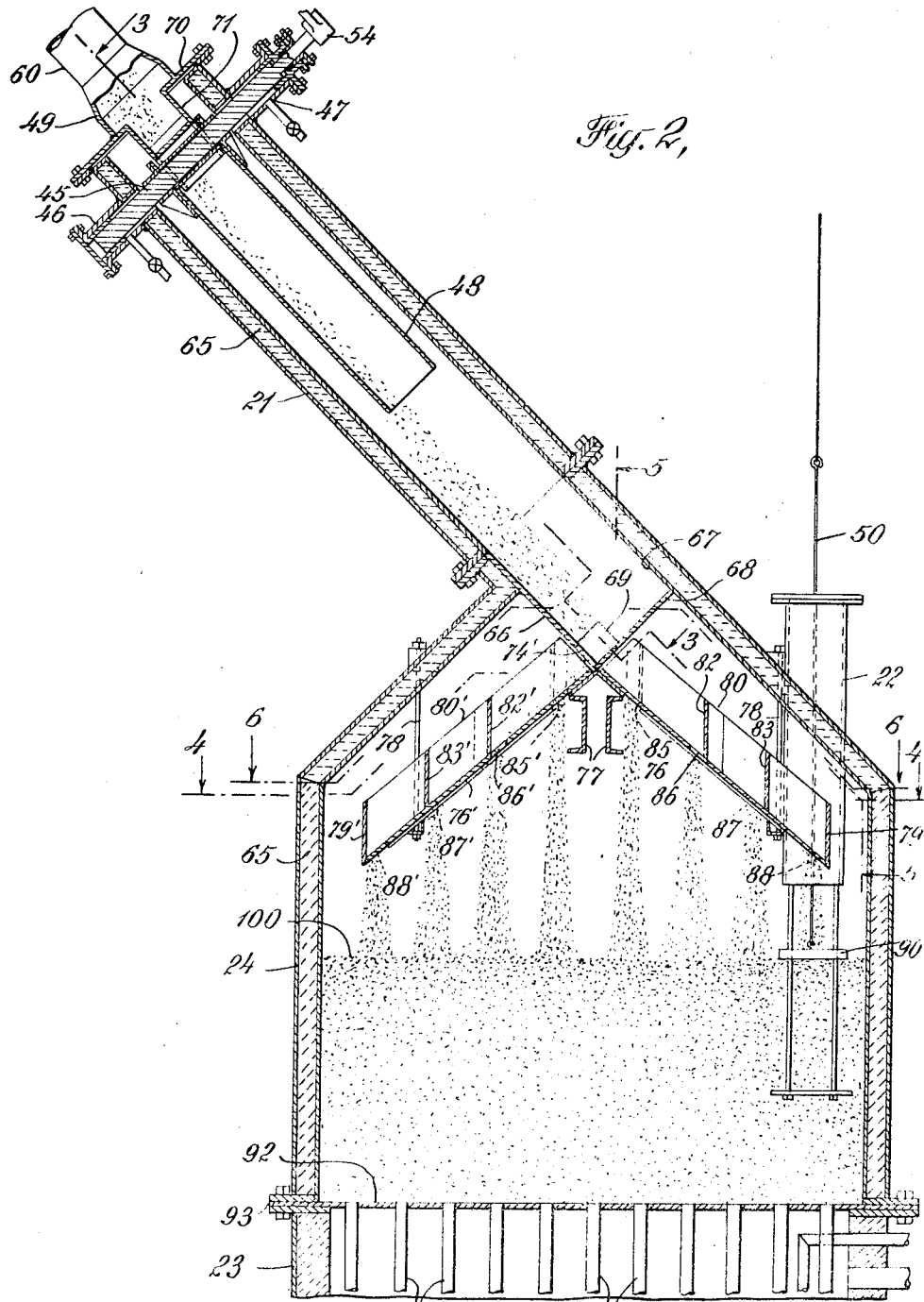

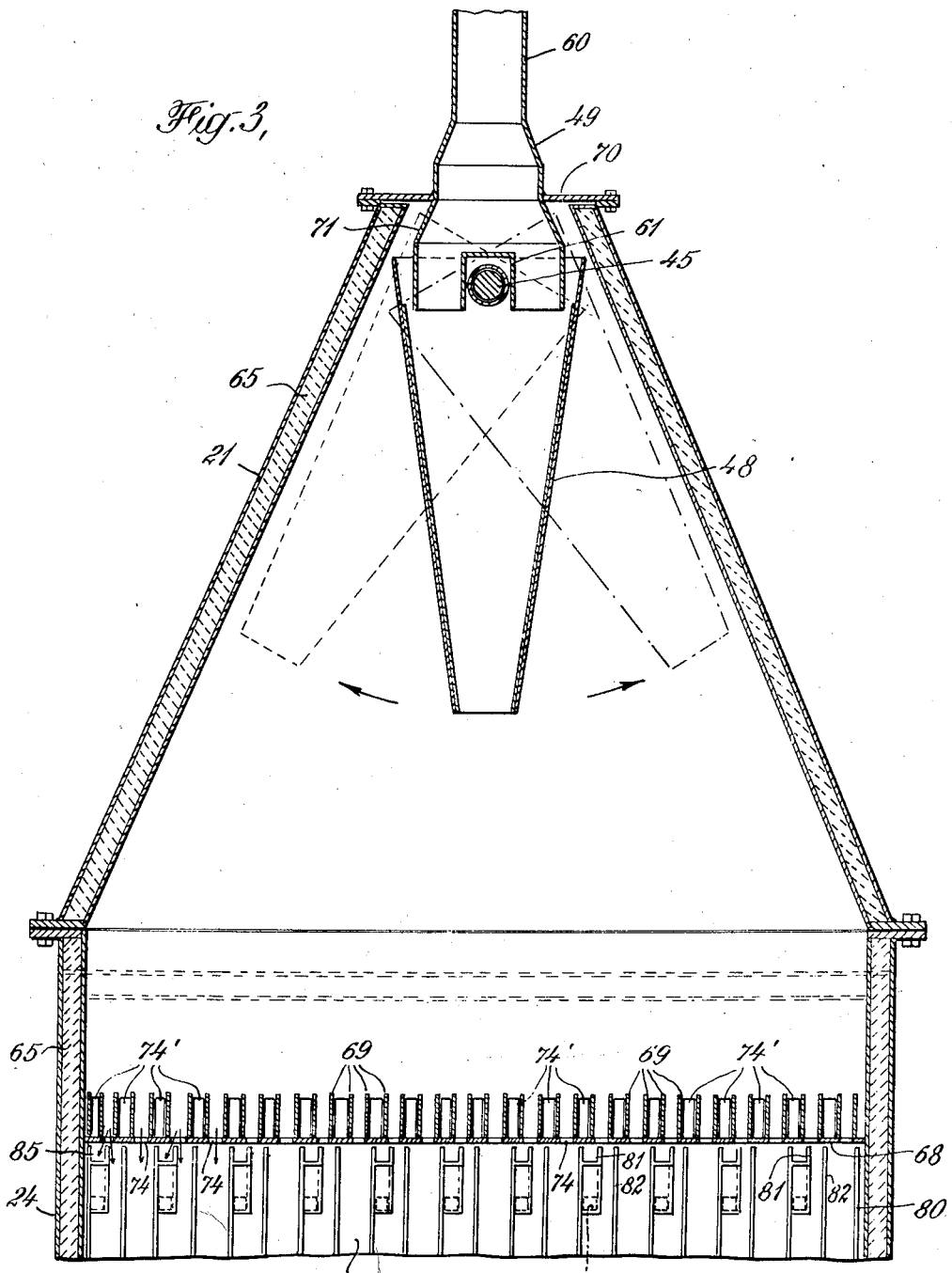

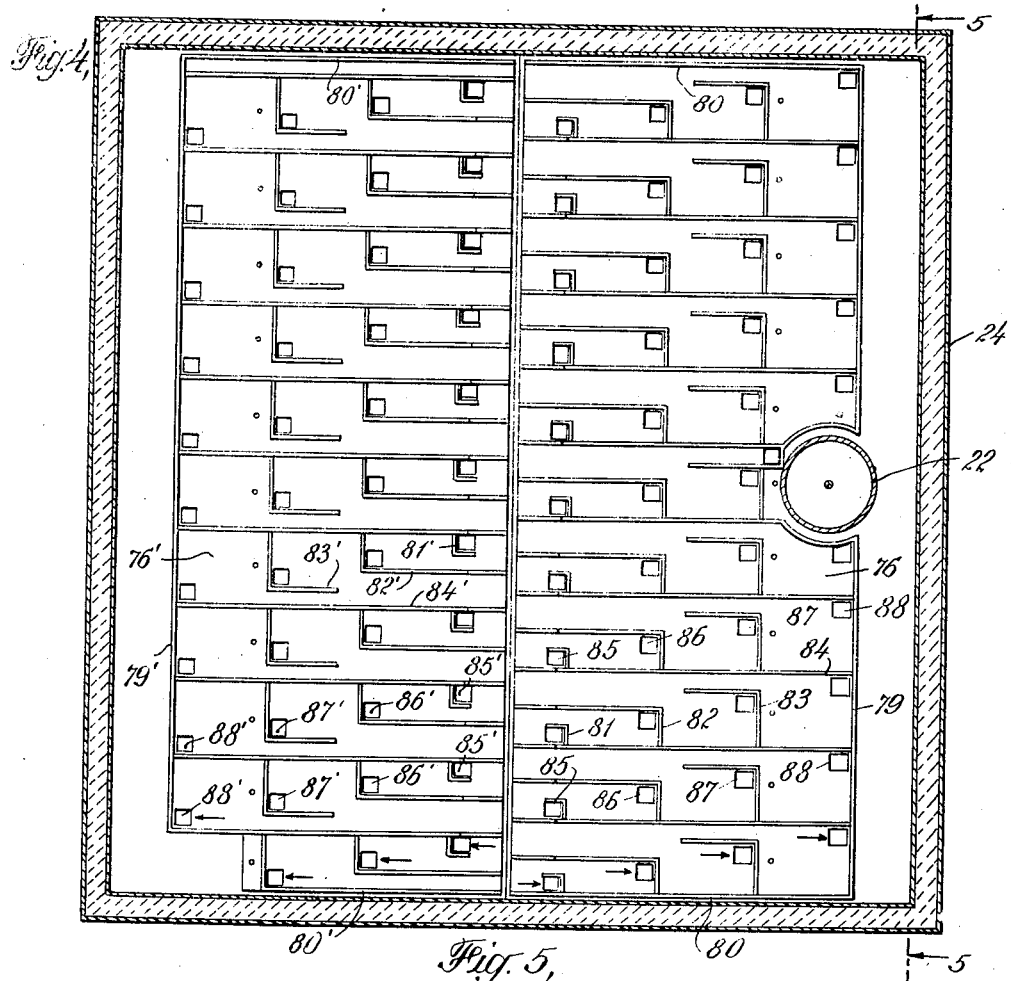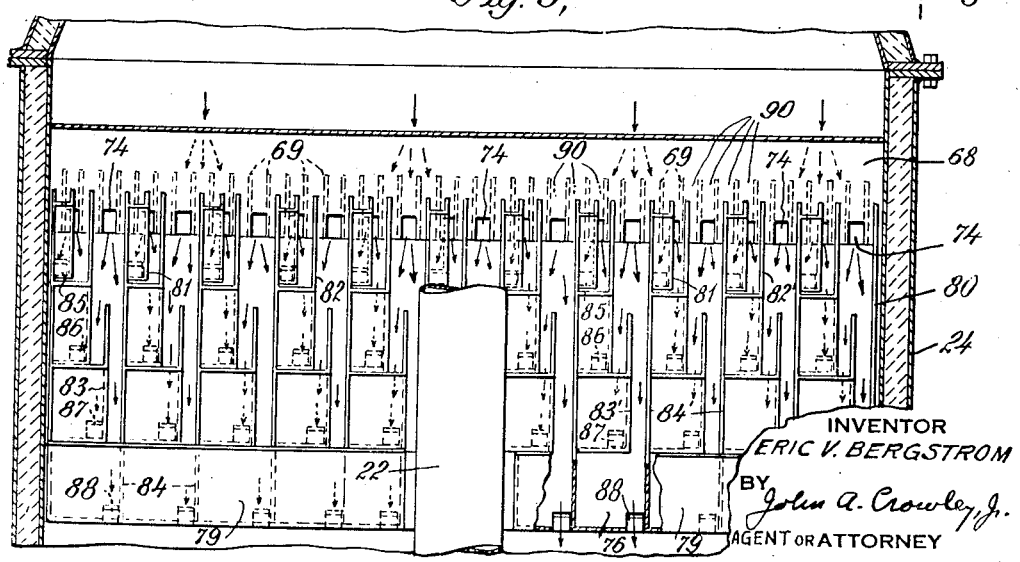

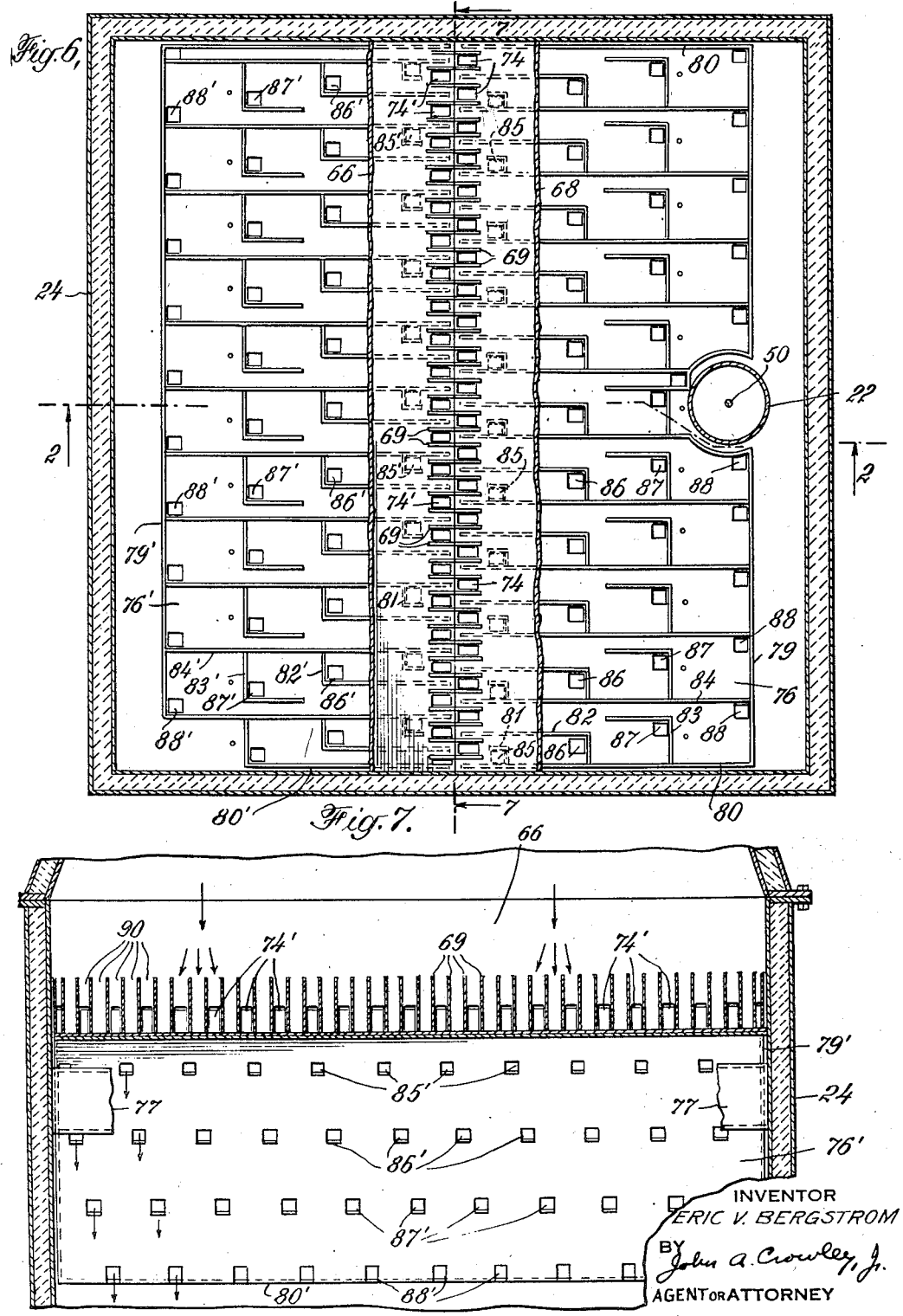

2,493,219

UNITED STATES PATENT OFFICE 2,493,219

METHOD AND APPARATUS FOR HYDRO-CARBON CONVERSION

Eric V. Bergstrom, Short Hills, N. J., assignor to Socony-Vacuum Oil Company, Incorporated, a corporation of New York Application July 30, 1947, Serial No. 764,834

11 Claims. (Cl. 196—52)

This invention pertains to systems wherein fluid reactants are contacted with moving beds of particle-form solid contact materials. It is particularly concerned with a cyclic system for conversion of fluid hydrocarbons in the presence of a substantially compact moving column.

Typical of such conversion processes is one wherein a particle-form adsorbent catalyst is moved cyclically through a conversion zone wherein it moves as a substantially compact column while being contacted with vaporized hydrocarbons for the purpose of converting them to lower boiling hydrocarbons such as gasoline and then through a regeneration zone wherein it moves as a substantially compact column while being contacted with a combustion supporting gas such as air to burn off from the catalyst carbonaceous contaminants deposited thereon in said conversion zone. This invention relates specifically to a method and apparatus for achieving uniform size distribution of contact material particles in the moving columns of solids in such systems. It is particularly concerned with method and apparatus for achieving uniform size distribution in a moving bed of solids supplied from a source above and to one side of the center of the bed.

In such catalytic moving-bed type systems the catalyst may partake of the natural or treated clays, synthetic associations of silica, alumina or silica or alumina or inert carriers bearing deposits of certain metallic oxides and the like. The invention is not considered to be limited to catalytic conversion systems but is intended to cover thermal conversion systems and heat exchange systems and the like wherein a substantially inert particle-form solid material moves cyclically through two or more zones in at least some of which it flows by gravity as a substantially compact column. In such systems the contact material may take the form of particles of refractory material, or even of metal. In any event, the normal condition of the contact material as used commercially includes particles of varying size within a predetermined size range. For example, in the catalytic cracking of hydrocarbon oils the catalyst particles may desirably fall within the range about 4 to 20 mesh. A small amount of fines formed by attrition of the normal sized particles will also be present.

In such systems wherein the contact material made up of particles of varying size is moved cyclically through two or more zones there is a pronounced tendency for the particles in the moving stream in certain parts of the system to classify according to size. For example, when the contact material is conveyed in elevator buckets between reaction zones the fines tend to settle towards the bottoms of the buckets. Similarly when the contact material passes from an elevator discharge to a surge hopper or to the reaction zone through a downwardly sloping chute, the smaller sized particles tend to settle to the bottom of the stream flowing in the chute.

This tendency for classification of particles of different sizes results in serious difficulties in such moving bed reaction systems. When the classified stream is fed on the top of the column in a reaction zone, the large particles are found on one side of the column and the smaller particles on the other side thereof, or localized veins of concentrated fines may occur through the column. Flow characteristics of a fluid medium passing through the column of contact material in the reaction zone will differ between the two sides of the column due to the classification of the granules. As a result non-uniform conversion of the hydrocarbon reactants is obtained and non-uniform coke deposits occur on the catalyst. In the regenerator the same difficulty arises and uneven regeneration of the catalyst results.

A major object of this invention is the provision, in a system wherein contact material of varying particle sizes is contacted as a substantially compact moving column with fluid reactants of a method and apparatus for supplying contact material to said column across its entire horizontal cross-sectional area uniformly both with respect to size of particles and amount.

Another object of this invention is the provision in a cyclic moving column type hydrocarbon conversion system wherein granular catalysts pass cyclically through a reactor and regenerator of a method and apparatus for supply of contact material particles of all sizes present substantially uniformly across the entire surface of each of said columns.

These and other objects of the invention will become apparent from the following discussion of the invention.

The invention may be most easily understood by reference to the drawings attached hereto of which Figure 1 is an elevational view showing the general arrangement of a cyclic hydrocarbon conversion system of the type to which this invention pertains;

Figure 2 is a vertical view, partially in section, showing in detail the upper section of one of the chambers of Figure 1 and the application of the apparatus of the invention thereto;

Figure 3 is a sectional view taken along line 3—3 in Figure 2;

Figure 4 is a horizontal sectional view taken along line 4—4 of Figure 2;

Figure 5 is a vertical view partially in section taken along line 5—5 of Figures 2 and 4;

Figure 6 is a horizontal sectional view taken along line 6—6 of Figure 2; and

Figure 7 is a vertical cross sectional view of a portion of the apparatus taken along line 7—7 of Figure 6.

All of these drawings are to some extent diagrammatic in form.

Turning now to Figure 1 there is shown a cyclic system for catalytic conversion of high boiling hydrocarbons such as gas oil fractions to gasoline and other products. Catalyst is particle-form, varying in size, for example 4–20 mesh (Tyler screen analysis) catalyst, passes from a supply hopper 10 downwardly through an elongated gravity feed leg 11 into the upper end of reaction vessel 12. The catalyst moves downwardly through vessel 12 as a substantially compact column while being contacted with hydrocarbon vapors introduced from stock preparation system 13 of conventional type into the lower section of vessel 12 via conduit 14. The gaseous hydrocarbon products pass from the upper section of the vessel 12 through conduit 15 to the product recovery system 16. The escape of hydrocarbons through the feed leg 11 is prevented by maintaining a blanket of an inert seal gas such as steam or flue gas within the upper end of vessel 12. The seal gas is introduced through conduit 17. Spent catalyst bearing a carbonaceous deposit is withdrawn from the lower end of vessel 12, through conduit 18 at a suitable rate controlled by valve 19. The catalyst is purged substantially free of gaseous hydrocarbons before being withdrawn from vessel 12 by means of an inert purge gas such as steam or flue gas introduced at 40. The spent catalyst passes to conveyor 20 from the upper end of which it is discharged through spout 59 to conduit 60 and thence through connecting duct 21 into the catalyst surge chamber 24. The catalyst passes downwardly from the surge chamber 24 into the regenerator vessel 23. Air is introduced into the lower section of the regenerator 23 through conduit 25. The air moves upwardly through the column of gravitating catalyst particles in chamber 23 or through suitable baffled air passageways therein so as to burn off the carbonaceous deposit from the catalyst. Spent regeneration gas is withdrawn via conduit 26, a suitable heat exchange fluid may be introduced to heat transfer tubes (not shown) within the chamber 23 via conduit 27. The fluid passes through the heat transfer tubes to remove the excess heat of contaminant combustion from the catalyst and is withdrawn from the tubes via conduit 28. Regenerated catalyst passes from the lower end of chamber 23 via conduit 29 to conveyor 30 by which it is conducted to the downwardly sloping duct 31 supplying hopper 10. The conveyors 20 and 30 may be of any suitable type adapted to transfer particle-form solids at elevated temperatures without excessive attrition of the solid particles. Continuous bucket elevators, for example, have been found to be satisfactory for this purpose. It will be understood that the reactor and regenerator vessels may vary somewhat from the particular construction described hereinabove. For example, the regenerator may be of the multi-stage type comprised of a vertical series of alternating burning and cooling zones, each burning zone having a separate gas inlet and outlet and each cooling zone having a separate set of heat transfer tubes therein and separate external manifolding associated with said heat transfer tubes.

Turning now to Figures 2–7 inclusive which may best be studied together, there is shown the upper portion of the surge chamber 24 and the catalyst feed device thereto. The chamber 24 is preferably of rectangular cross-sectional shape, but may be of other shape. The connecting duct is substantially uniform in cross-sectional height along its length but tapers outwardly in width from a small cross-section at its upper end to the width of chamber 24 at its lower end. Across the upper section of the duct 21 in the plane of its constant cross-section there is provided a shaft 45 which is journaled on one end at 46 and supported on the other end by bearings in packing box 47. One end of the shaft extends through box 47 and connects to lever 54 which in turn is moved back and forth by a suitable drive mechanism 55 powered by motor 56. The motor 56 is supported on stand 57 by means of members 58 extending upwardly from duct 21. A spout 48 is attached to shaft 45 and is continuously oscillated back and forth across the width of duct 21 by the reversible rotation of shaft 45 so as to distribute solids uniformly entirely thereacross. The spout 48 may be tapered as shown in one or both cross-sectional dimensions or it may be of uniform or substantially uniform cross-section along its length. The upper end of duct 21 is closed by the top plate 70 and a delivery nozzle 71 is connected to the inner side of the top plate 70 and extends downwardly to a point within the movable spout 48. The delivery nozzle 71 may be conveniently enlarged in cross-sectional dimensions in one plane as shown and is notched at 61 so as to prevent interference with the rotation of shaft 45. A swaged nipple 49 connects the lower end of the conduit 60 through the top plate 70 so as to direct flow of contact material discharged from the conveyor into conduit 60 into the nozzle 71.

The side walls of both the duct 21 and the chamber 24 consist of a layer of temperature insulating material 65 encased by metal plates both on the inside and outside of the vessel. The metal plates lining the inside of duct 21 are extended at 66 and 67 downwardly into the top of chamber 24 to a line which is substantially centrally located with respect two opposite sides of the vessel. The extended duct is closed off on its lower end by means of plate 68 which connects perpendicularly to plates 66 and 67. The arrangement is such as to provide a confined V-shaped trough extending horizontally across the upper section of the chamber 24 with its heel facing downwardly and positioned along a horizontal line substantially midway between the two side walls of the chamber 24 which are parallel to the trough length. A number of vertical partitions 69 positioned perpendicularly to the bottom sides 66 and 68 of the trough are spaced at equal horizontal intervals along its horizontal length thereby dividing the trough into a horizontal series of side by side cells or pockets having V-shaped bottoms. These cells may be best seen at 90 in Figures 5 and 7. Holes 74 and 74' are located in the bottom of each cell, the holes 74 and 74' being located on opposite sides of the trough heel in adjacent cells. Below the trough formed by plates 66 and 68 within the chamber 24 are positioned two upwardly converging partitions 76 and 76' which converge along a line or ridge immediately below and extending parallel to the heel of the trough formed by plates 66 and 68. The partitions 76 and 76' together cover most of the width of the chamber 24 in the direction of their slope and extend laterally substantially entirely across the chamber 24 in the other horizontal direction. These partitions may be supported by I beams 77 and rods 78 which in turn are supported from the walls and roof of chamber 24 respectively. Vertical partitions 79 and 79' are connected along the lower edges of partitions 76 and 76' respectively to provide walls which are adapted to prevent flow of solids off the lower edges of the sloping partitions. Side walls 80 and 80' are connected along the side edges of the sloping partitions 76 and 76' respectively to prevent flow of solids off the side edges of the sloping partitions. The vertical partitions 79, 79', 80 and 80' may be of any suitable height, for example, about 2 to 12 inches in height. Along each of the sloping partitions 76 and 76' are provided a plurality of spaced rows of small holes 85—88 and 85'—88' respectively, each row of holes extending horizontally across the partition in the same direction as the connection ridge between partitions 76 and 76', and the rows being spaced apart at intervals along the sloping length of the partitions. The holes in each row in partition 76 are offset horizontally from the holes in any other row so that a straight lane for solid flow runs down the partition 76 perpendicularly to the line of the connecting ridge at its upper end directly to each individual hole without any other hole lying in that path. The holes may be of such size and spacing as to cut all the elements of the slant heights of the respective partitions or the holes in less preferred forms of the invention may be such as to leave some elements of the slant height of the partitions uncut by any holes. In order to insure that all solids flowing from the ridge to each hole in said partition 76 do not escape the proper hole, vertical partitions 81, 82, 83 and 84 are arranged on the partition 76 in such a manner as to provide pockets confining each individual hole on all sides except the side facing the ridge at the upper edge of the partition 76. In the arrangement shown there are four horizontal rows of holes on partition 76 so that it is convenient to isolate the holes all across the partition in side by side identical groups of four. This is accomplished by means of a plurality of parallel, straight upright partitions 84 connected along the upper face of partition 76. The partitions 84 run the full length of the sloping partition 76 in a direction perpendicular to the connecting ridge at its upper end and terminating just short of the plate 68. Between any two parallel partitions 84 there are four holes on the partition 76, one from each horizontal row. The two holes 85 and 86 in the upper two horizontal rows of holes and the holes 87 and 88 in the lower two rows are further isolated into two subgroups by the partitions 82 which are of right angular cross-section shape, one of said partitions 82 being positioned about horizontally midway between each two successive partitions 84. One side of each partition 82 extends from just below hole 86, parallel to partitions 84 all the way up to the connecting ridge at the upper end of partition 76. The spacing of the partitions 82 and 84 are such that the horizontal distance across the sloping partition 76 between nearest successive partitions 84 is equal to the length of four cells 90. The corresponding horizontal distance from either side of a partition 82 to a partition 84 is equal to the length of two cells. Since only alternate cells contain holes 74 which are above partition 76, this means that two holes 74 deliver solid into the area defined between any two successive partitions 84. The horizontal dimension of this area is divided approximately in half by partitions 82 and each half is centrally fed with solids from a hole 74 in the bottom of a cell 90. Vertical partitions 81 of right angular cross-sectional shape serve in conjunction with partitions 84 to enclose the holes 85 on all but that side facing the upper edge of partition 76. The longitudinal side of partition 81 is horizontally positioned about in line with the center of a hole 74 so as to deflect half of the solids flowing from hole 74 to a hole 85 while permitting the other half of the solid material from that hole 74 to flow in a substantially straight path to a hole 86. Similarly the partitions 83 which are also of right angular cross-sectional shape enclose holes 87 and deflect half of the solid flow from a hole 74 to a hole 87 while permitting the other half of the solid flow to pass to a hole 88. Similar vertical partitions 81'—84' are positioned on sloping partition 76' and the arrangement is the same as described in connection with partition 76 except that all holes 85'—88' and all partitions 81'—84' on partition 76 are horizontally offset from the corresponding holes and partitions on partition 76 the length of one cell 90.

A level indicating device 22 connects into the upper end of chamber 24 to indicate the level of the contact material therein. In the arrangement shown this device consists of a movable plate 90 which can be pulled up and then permitted to drop periodically. The partition 76 is cut away sufficiently to make room for this level indicating device as may be seen in Figures 4 and 6. A horizontal partition 92 supported between flanges 93 defines the bottom of chamber 24. A plurality of solid flow pipes 94 depend from partition 92 and terminate at a common level within the upper portion of regenerator 23. These pipes 94 are uniformly spaced over the horizontal cross-sectional area of partition 92.

In operation catalyst is discharged from conveyor 29 through chute 59 from which it enters conduit 60. The catalyst then flows through delivery nozzle 71 into the movable spout 48 and is distributed uniformly over the bottom of connecting duct 21 as the lower end of spout 48 slowly moves back and forth across the width of the duct. The catalyst then flows into the cells 90 at the lower end of duct 21. The catalyst at this point is not uniformly mixed as to size, the fines having settled to the bottom of the stream in passing down the sloping duct 21. However, it will be apparent that regardless of the vertical segregation of fines in the stream moving down duct 21, there is no material variation in size distribution in the catalyst stream at different locations across the horizontal width of duct 21. In other words, while the catalyst filling any cell 90 is not uniformly mixed, still the size distribution in the total catalyst entering all of the cells 90 is about the same. The catalyst passes from the V-shaped bottoms of the cells 90 directly onto the sloping partitions 76 and 76'. The catalyst then flows down the sloping partitions 76 and 76' to the particular hole therein which is directly in its lane of flow. For example, the catalyst streams from alternate holes 74 may be split by a fractionator 81 vertically into two streams, one flowing to holes 85 and the other to a hole 86 in the next row down the partition. Likewise catalyst from the remaining alternate holes 74 are split vertically by partitions 83, part flowing to holes 87 and the remainder to holes 88.

Since the segregation in any catalyst stream passing from a hole 74 is only vertically of the stream, (i. e. the fines settle to the bottom) the vertical splitting of that stream across the layers of segregation by a partition 82 or 83 results in two streams which if analyzed contain about the same particle size distribution. Moreover, as pointed out hereinabove, the particle size distribution is about the same in the catalyst streams flowing from all the holes 74 and 74'. As a result equal amounts of catalyst of about the same particle size distribution pass to all of the holes in partitions 76 and 76'. It will be noted that the spacing of the rows of holes and the spacing of the holes in each row in partitions 76 and 76' is such that the catalyst streams passing through these holes and falling down to the bed therebelow as shown in Figure 2 are substantially uniformly distributed over the entire horizontal cross-sectional area of that portion of the vessel occupied by the moving bed. Thus it will be apparent that catalyst is supplied at a uniform rate and of a uniform size distribution to all portions of the horizontal cross-sectional area of the surface of the bed 100 in chamber 24.

This operation is to be contrasted with the usual prior art operation wherein catalyst from elevator 20 passes down an inclined chute and discharges from the lower end of said chute centrally into the surge chamber 24 either above or directly onto the surface of the bed of catalyst therein. Some classification of fines from coarser particles has occurred in the elevator buckets. In the sloping chute feeding the surge chamber 24 further classification occurs, the fines settling to the bottom of the stream so as to be supplied mostly on that side of the bed in chamber 24 nearest the elevator. As a result the undersized catalyst particles tend to move downwardly through the regenerator 24 on one side thereof while the larger particles tend to move downwardly through the other side thereof. Moreover, further segregation occurs as the catalyst distributes itself over the surface of the bed in chamber 24 from the single central supply point, the coarser particles seeking the outer edges of the bed. Consequently, there will be an excessive rate of gas flow through that portion of the column in regenerator 23 offering the least resistance, namely the portion in which the larger catalyst particles are concentrated. There will occur too little gas flow in the remaining portions of the vessel horizontal cross-sectional area. Uneven regeneration of the catalyst and localized overheating of the catalyst during regeneration is the result. On the other hand when the method and apparatus of this invention is employed, classification of the catalyst particles of different sizes still occur in elevator 20 and duct 21 but still by the method described the surface of bed 100 in chamber 24 is supplied with catalyst of substantially the same particle size distribution uniformly over all portions of its horizontal cross-sectional area. As a result uniform catalyst size distribution is maintained in all portions of the column in regenerator 23 thereby insuring uniform rates of gas flow through all sections of the column.

A similar catalyst distribution arrangement may be provided in association with supply duct 31 within the reactor supply hopper 10 shown in Figure 1. While the system shown in feed duct 21 including the movable spout 48 and the arrangement of cells 90 shown is to be employed in the preferred form of this invention, other arrangements adapted to feed solids of the same particle size distribution all along the connecting ridge between partitions 76 and 76' may be substituted therefor. Also in a modified form of the invention the holes and partitions on partitions 76 and 76' may be so arranged and spaced, that all the solid material from any hole 74 or 74' passes directly to only one hole on partition 76 or 76', thereby eliminating the split in these streams caused by partitions 82 and 83. It is contemplated also that the arrangement of the vertical partitioning on the sloping partitions 76 and 76' may be modified somewhat from that shown as long as the partitioning provided is adapted to prevent escape from any given hole in a sloping partition of solid material flowing down the sloping partition in the lane (perpendicular to the ridge) in which that hole is located. The width of such lanes may be determined either by the lateral dimensions of the holes in the sloping partitions or of the openings to the enclosed areas defined by the vertical partitioning which surrounds each of those holes on three sides.

It is important that the slope of the partitions 76 and 76' and that of the duct 21 be at least about 35° and preferably 45° or greater with the horizontal in order to insure proper gravity flow of the granular solid material.

It should be understood that the details of construction and of application of this invention given hereinabove are intended as exemplary and should not be construed as limiting the scope of this invention except as it is limited to the following claims.

I claim:

1. A continuous cyclic process for the catalytic conversion of hydrocarbons comprising: passing an adsorbent catalyst consisting of particles of differing sizes downwardly through a confined conversion zone as a substantially compact column while passing fluid hydrocarbon reactants through said column to effect the conversion thereof, maintaining a separate column of downwardly moving catalyst in a confined regeneration zone in contact with a combustion supporting gas to burn carbonaceous contaminants from said catalyst, maintaining a bed of spent catalyst in a spent catalyst supply zone vertically above said column in said regeneration zone and communicating therewith through at least one compact gravitating stream of catalyst, withdrawing spent catalyst from said conversion zone and conveying it upwardly to a location above and laterally of said spent catalyst supply zone, continuously flowing a stream of said spent catalyst from said location onto the upper end of a flat inclined surface of substantial width and effecting uniform distribution of catalyst all across said surface by oscillating the discharge end of said stream laterally back and forth across the width of said flat inclined surface, flowing the distributed catalyst down said inclined surface as a substantially continuous primary stream to a location within the upper section of said supply zone substantially above the surface of the bed therein, whereby the smaller particles become concentrated along the bottom of said primary stream, splitting said primary stream as it reaches the lower end of said inclined surface along vertical planes running transversely of the width of said primary stream to form a plurality of secondary streams, whereby the overall distribution particle size in each secondary stream is substantially the same as in said primary stream, flowing said secondary streams in downwardly sloping paths to a plurality of spaced locations above the surface of said bed and uniformly distributed with respect its horizontal cross-sectional area, flowing said secondary streams substantially vertically downward from said locations onto the surface of said bed, withdrawing regenerated catalyst from the lower section of said regeneration zone and returning it to said conversion zone.

2. A method for distributing granular solids onto a substantially compact moving bed thereof from a source of said solid spaced laterally of and above said bed which comprises: flowing said granular solid material down an inclined surface as a single primary stream of substantial horizontal width, splitting said primary stream vertically and transversely of its horizontal width into a plurality of components at intervals along its width and collecting said components to provide a plurality of separate accumulations existing side by side along a horizontal line above said bed and extending in one direction centrally across the projected horizontal cross-sectional area of said bed, passing contact material streams from adjacent accumulations down oppositely inclined surfaces sloping downwardly from the line of said accumulations, splitting the stream from each accumulation transversely of its horizontal width into two components and continuing the flow of said last named components down said inclined surfaces, trapping said last named components in a plurality of pockets which are isolated from each other and are uniformly distributed over said oppositely inclined surfaces, and passing said components substantially vertically downward from said pockets onto the surface of said bed.

3. In a cyclic process for the conversion of hydrocarbons wherein a particle-form solid contact material is passed cyclically through a first reaction zone wherein it moves downwardly as a substantially compact column while being contacted with hydrocarbon reactants to effect the conversion thereof and through a second reaction zone wherein it moves downwardly as a substantially compact column while being contacted with a combustion supporting gas to burn off of the contact material carbonaceous material deposited thereon in the first reaction zone, the method for uniformly distributing the contact material onto the column thereof in either of said zones which comprises: passing said particle-form contact material down an inclined surface into the upper section of said reaction zone above the surface of the column therein as a single sloping primary stream having a substantial horizontal width, splitting said stream along a plurality of vertical planes running transversely of the width of said stream and located at intervals along its horizontal width and along a division line above the surface of said column extending horizontally centrally across its projected cross-sectional area to divide said single stream into a plurality of side by side components each having substantially the same distribution of sizes of particles as said primary stream, passing alternate components down an inclined surface sloping downwardly from below said division line in one direction, passing the remaining alternate components down an inclined surface sloping downwardly from below said division line in the opposite direction trapping said components on said inclined surfaces in a plurality of pockets substantially uniformly distributed with respect the projected horizontal cross-sectional area of said column, said pockets being laterally isolated from each other and passing said components substantially vertically downward from said locations onto the surface of said column.

4. In combination a vertical vessel adapted for downward movement of a substantially compact bed of particle-form solid therethrough, a source of said solid spaced above and laterally of said vessel, a V-shaped trough extending horizontally across the upper section of said vessel about midway between two sides of said vessel, a plurality of transverse partitions extending across said trough at a plurality of intervals along its length dividing the trough into an end to end series of cells having V-shaped bottoms, a duct of substantial horizontal width extending downwardly from said source of solids to said trough, for flow of solids into said trough, the width of said duct extending parallel to the length of said trough, an opening in the bottom of each of said cells, the openings in adjacent cell bottoms being on opposite sides of the trough heel, two oppositely sloping partitions within the upper section of said vessel converging along their upper edges to form a ridge running in the horizontal direction of the sloping partition width and parallel to the heel of said trough and immediately therebelow, a plurality of holes in said sloping partitions distributed substantially uniformly over the horizontal cross-sectional area of said vessel, the holes in each sloping partition being further so positioned that every hole is offset horizontally in the direction of the sloping partition width from any hole in that partition, vertical partitioning on said sloping partitions adapted to isolate each hole in said sloping partitions on all sides excepting the side facing the ridge between partitions and members forming sides around the edges of said sloping partitions to prevent flow of solids off the edges thereof.

5. In combination a vertical vessel adapted for downward movement of a substantially compact bed of particle-form solid therethrough, a horizontal trough extending transversely and substantially centrally across the upper section of said vessel, said trough having a V-shaped bottom with the heel between the sloping bottom sides down, means to supply solid material uniformly along the length of said trough, two oppositely sloping partitions within the upper section of said vessel converging at their upper edges along a ridge which extends centrally, horizontally across said vessel parallel to the heel of said trough and immediately below said heel, a plurality of spaced holes in said partitions uniformly distributed with respect the horizontal cross-sectional area of said vessel, a plurality of openings in the sloping bottom of said trough at equally spaced intervals along its length for flow of solids from said trough onto the upper portions of said sloping partitions, upright secondary partitioning on said sloping partitions adapted to enclose an area around each of said holes on three sides leaving an opening to the area only on the side facing the ridge between said sloping partitions, each of the openings to an enclosed area on each one of said sloping partitions being laterally offset along the partition surface from the opening to any other enclosed area on that sloping partition and each of said last named openings being horizontally in line with at least a portion of one of said openings in the bottom of said trough.

6. In combination a vertical vessel adapted for downward movement of a substantially compact bed of particle-form solid material therethrough, a source of said solid material spaced above and laterally of said vessel, a horizontal trough extending transversely and substantially centrally across the upper section of said vessel, said trough having a V-shaped bottom with the heel between the sloping bottom sides facing down, a plurality of transverse partitions extending across said trough at a plurality of intervals along its length dividing the trough into an end to end series of cells having V-shaped bottoms, a duct of substantial horizontal width extending downwardly from said source of solids to said trough for flow of solids into said trough, the width of said duct extending parallel to the length of said trough, an opening in the bottom of each of said cells, the openings in adjacent cell bottoms being on opposite sides of the trough heel, two oppositely sloping partitions within the upper section of said vessel converging along their upper edges to form a ridge running in the horizontal direction of the width of the sloping partitions and parallel to the heel of said trough and immediately therebelow, a plurality of holes in said sloping partitions distributed substantially uniformly over the horizontal cross-sectional area of said vessel, substantially vertical partitioning on each of said sloping partitions enclosing on three sides a separate area adjacent each of said holes in the sloping partition surface, each hole being at the lower edge of its corresponding area, said partitioning providing openings to each enclosed area only facing the ridge between partitions, which openings are of equal width and horizontally offset in the direction of the sloping partition width from any other area opening on the same sloping partition, said vertical partitioning being further so spaced that the opening to any enclosed area is horizontally in line in the direction at right angles to the partition width with at least a portion of the area of one of the facing cell openings.

7. In combination a vertical vessel adapted for downward movement of a substantially compact bed of particle-form solid material therethrough, a source of said solid material spaced above and laterally of said vessel, a horizontal trough extending transversely and substantially centrally across the upper section of said vessel, said trough having a V-shaped bottom with the heel between the sloping bottom sides facing down, a plurality of transverse partitions extending across said trough at a plurality of intervals along its length dividing the trough into an end to end series of cells having V-shaped bottoms, a duct of substantial horizontal width extending downwardly from said source of solids to said trough for flow of solids into said trough, the width of said duct extending parallel to the length of said trough, an opening in the bottom of each of said cells, the openings in adjacent cell bottoms being on opposite sides of the trough heel, two oppositely sloping partitions within the upper section of said vessel converging along their upper edges to form a ridge running in the horizontal direction of the sloping partition width parallel to the heel of said trough and immediately therebelow, a plurality of parallel, spaced rows of horizontally spaced holes on each of said sloping partitions, each row extending parallel to the ridge between said sloping partitions and the holes in any row in each partition being horizontally offset across the width of the partition from the holes in any other row in the same sloping partition, the holes and rows being so spaced that the holes are substantially uniformly distributed over the horizontal cross-sectional area of said vessel, said holes in said sloping partitions being further so positioned that at least a portion of each hole in each sloping partition is in line horizontally with at least a portion of one of said openings in the bottoms of said cells which supply solids to that sloping partition, vertical partitioning on said sloping partitions adapted to isolate each hole in said sloping partitions on all sides excepting the side facing the ridge between partitions.

8. In combination a vertical vessel adapted for downward movement of a substantially compact bed of particle-form solid material therethrough, said vessel being of rectangular cross-sectional shape, a source of said solid spaced above and laterally of said vessel, a horizontal trough extending across said vessel substantially midway between the two opposite sides of said vessel which are parallel to the length of said trough, said trough having a V-shaped bottom, the heel of which is down, a plurality of transverse partitions across said trough at spaced intervals along its length dividing it into a series of cells, an inclined duct extending upwardly from said trough at right angles to the trough heel for the flow of solids into said trough, said duct having a horizontal width at its lower end substantially equal to the length of said trough, a movable feed spout positioned within the upper section of said duct and mechanical means to move the lower end of said spout back and forth across the width of said trough, passage defining means for flow of solids from said source into the upper end of said movable spout, openings in the bottoms of said cells, the openings in adjacent cells being on opposite sides of the bottom heel, two oppositely sloping partitions having a horizontal width as great as the length of said trough positioned in the upper section of said vessel so as to converge together along a ridge parallel to and directly below said trough bottom heel, said partitions terminating on their lower ends near opposite walls of said vessel, a plurality of holes in said sloping partitions, said holes being uniformly distributed with respect the horizontal cross-sectional area of said vessel, each hole in each sloping partition being positioned in a different lane extending down the sloping partition perpendicularly to the ridge and each of said lanes being horizontally in line with at least a portion of one of said openings in the bottoms of said cells which supply solids to that sloping partition, secondary vertical partitioning on said sloping partitions adapted to confine the solid flow in any one of said lanes to the hole in that lane.

9. In combination a vertical regeneration chamber of rectangular cross-sectional shape having gas inlet and gas outlet means thereon, means to withdraw catalyst from the lower section of said regeneration chamber, a catalyst surge chamber above said regeneration chamber also of rectangular cross-sectional shape, a plurality of uniformly distributed catalyst flow conduits depending from the bottom of said surge chamber and terminating in said regeneration chamber, a pair of upwardly converging, sloping partitions positioned in the upper section of said surge chamber, said partitions converging along a ridge which extends horizontally, substantially entirely across said surge chamber midway between two opposite parallel sides of said chamber and the sloping partitions terminating on their lower ends near said opposite walls of the chamber, an upwardly sloping catalyst feed duct having a flat bottom, extending upwardly from a line across said surge chamber directly above said ridge between the sloping troughs, said duct being of substantially the width of said sloping partitions on its lower end, a closure plate connected perpendicularly to the flat bottom of said duct closing of the lower end of the duct and defining with the flat bottom of said duct a V-shaped trough the heel of which is down and extends horizontally across said surge chamber parallel to the ridge between said sloping troughs and directly thereabove, a plurality of spaced, transverse partitions positioned perpendicularly to said closure plate to divide said through into a series of cells of equal length extending end to end across said trough, each of said cells having an opening in its bottom, the openings in adjacent cells being on opposite sides of the trough heel, a plurality of parallel, spaced rows of horizontally spaced holes on each of said sloping partitions, each row extending parallel to the ridge between said sloping partitions and the holes in any row in each partition being horizontally offset across the width of the partition from the hole in any other row in the same sloping partition, the holes and rows being so spaced that the holes are substantially uniformly distributed over the horizontal cross-sectional area of said vessel, said holes in said sloping partitions being further so positioned that at least a portion of each hole in each sloping partition is in line horizontally with at least a portion of one of said openings in the bottoms of said cells which supply solids to that sloping partition, vertical partitioning on said sloping partitions adapted to isolate each hole in said sloping partition on all sides excepting the side facing the ridge between partitions, a movable catalyst feed spout positioned in the upper section of said feed duct, means to oscillate the lower end of said feed spout across the width of said feed duct, and means to supply catalyst into the upper end of said feed spout.

10. In combination a vertical regeneration chamber of rectangular cross-sectional shape having gas inlet and gas outlet means thereon, means to withdraw catalyst from the lower section of said regeneration chamber, a catalyst surge chamber above said regeneration chamber also of rectangular cross-sectional shape, a plurality of uniformly distributed catalyst flow conduits depending from the bottom of said surge chamber and terminating in said regeneration chamber, a pair of upwardly converging, sloping partitions positioned in the upper section of said surge chamber, said partitions converging along a ridge which extends horizontally, substantially entirely across said surge chamber midway between two opposite parallel sides of said chamber and the sloping partitions terminating on their lower ends near said opposite walls of the chamber, an upwardly sloping catalyst feed duct having a flat bottom, extending upwardly from a line across said surge chamber directly above said ridge between the sloping troughs, said duct being of substantially the width of said sloping partitions on its lower end, a closure plate connected perpendicularly to the flat bottom of said duct closing off the lower end of the duct and defining with the flat bottom of said duct a V-shaped trough the heel of which is down and extends horizontally across said surge chamber parallel to the ridge between said sloping troughs and directly thereabove, a plurality of spaced, transverse partitions positioned perpendicularly to said closure plate to divide said trough into a series of cells of equal length extending end to end across said trough, each of said cells having an opening in its bottom, the openings in adjacent cells being on opposite sides of the trough heel, a plurality of spaced holes on said sloping partitions substantially uniformly distributed across the horizontal cross-sectional area of said surge chamber, said holes in each one of said partitions being further so arranged that each hole is positioned in a separate lane extending down said sloping partition perpendicularly to the ridge, vertical partitioning on said sloping partitions adapted to enclose on three sides a plurality of areas on the surface of said sloping partitions, a separate one of the holes in said sloping partitions being positioned near the lower edge of each of said enclosed areas, said vertical partitioning leaving openings to said enclosed areas which openings face the ridge between sloping partitions and are so located laterally across said sloping partitions that each opening is at least partially in the straight lane of solid flow down the partition from one of said bottom openings in said cells, upwardly extending side walls connected along the lower and the sloping edges of the sloping partitions, a movable catalyst feed spout positioned in the upper section of said feed duct, means to oscillate the lower end of said feed spout across the width of said feed duct, and means to supply catalyst into the upper end of said feed spout.

11. In combination a vertical vessel adapted for downward movement of a substantially compact bed of particle-form solid therethrough, a horizontal trough extending transversely and substantially centrally across the upper section of said vessel, said trough having a V-shaped bottom with the heel between the sloping bottom sides down, a plurality of openings in the bottom of said trough at equally spaced intervals along its length on both sides of the bottom heel, a flat bottomed inclined chute extending upwardly from said trough for supply of solid material, said chute extending width-wise at its lower end substantially the entire length of said trough, a movable solid material feed spout positioned in the upper section of said feed chute and means to oscillate the lower end of said feed spout transversely across the width of said feed chute, two oppositely sloping partitions within the upper section of said vessel converging at their upper edges along a ridge which extends centrally, horizontally across said vessel parallel to the heel of said trough and immediately below said heel, a plurality of spaced holes in said partitions uniformly distributed with respect the horizontal cross-sectional area of said vessel said holes in said sloping partitions being further so spaced that they cut all the elements of the slant height of the respective planes of the sloping partitions and each hole cuts different elements of the slant height of the planes of the respective sloping partitions, vertical partitions on said sloping partitions adapted to isolate each hole in said sloping partitions on all sides excepting the side facing the ridge between partitions.

ERIC V. BERGSTROM.

REFERENCES CITED

The following references are of record in the file of this patent:

UNITED STATES PATENTS

| Number | Name | Date |
|---|---|---|
| 648,933 | Edison | May 8, 1900 |
| 955,614 | Stone et al. | Apr. 19, 1910 |
| 2,422,470 | Cover | June 17, 1947 |
| 2,438,201 | Utterback | Mar. 23, 1948 |